US012650093B1

(12) United States Patent
Nasir et al.

(10) Patent No.: US 12,650,093 B1
(45) Date of Patent: Jun. 9, 2026

(54) GAS TURBINE ENGINES AND METHODS FOR PARTICLE SEPARATION

(71) Applicant: HONEYWELL INTERNATIONAL INC., Charlotte, NC (US)

(72) Inventors: Shakeel Nasir, Phoenix, AZ (US); Partha Das, Phoenix, AZ (US); Jason Smoke, Phoenix, AZ (US); Frank Zupanc, Phoenix, AZ (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 0 days.

(21) Appl. No.: 19/237,755

(22) Filed: Jun. 13, 2025

(51) Int. Cl.
| | |
|---|---|
| *F02C 7/052* | (2006.01) |
| *F02C 9/18* | (2006.01) |
| *B64D 33/02* | (2006.01) |

(52) U.S. Cl.
CPC ............... *F02C 7/052* (2013.01); *F02C 9/18* (2013.01); *B64D 2033/0246* (2013.01)

(58) Field of Classification Search
CPC .. F02C 7/05; F02C 7/052; F02C 7/055; F02C 9/18; B64D 2033/0246
See application file for complete search history.

(56) References Cited

U.S. PATENT DOCUMENTS

| | | | |
|---|---|---|---|
| 3,362,155 A | 1/1968 | Francis | |
| 3,720,045 A | 3/1973 | Murphy | |
| 3,993,463 A | 11/1976 | Barr | |

| | | | |
|---|---|---|---|
| 4,527,387 A | 7/1985 | Lastrina et al. | |
| 4,928,480 A | 5/1990 | Oliver et al. | |
| 5,351,478 A * | 10/1994 | Walker | F04D 29/522 60/785 |
| 6,302,647 B1 | 10/2001 | Schueler et al. | |
| 7,581,397 B2 | 9/2009 | Strangman et al. | |
| 8,092,145 B2 | 1/2012 | Martel et al. | |
| 8,539,775 B1 | 9/2013 | Wong | |
| 8,935,926 B2 | 1/2015 | Wagner et al. | |
| 9,546,603 B2 | 1/2017 | Meier et al. | |
| 9,897,006 B2 | 2/2018 | Miranda et al. | |
| 9,909,497 B2 | 3/2018 | Feulner et al. | |
| 10,030,581 B2 | 7/2018 | Gekht et al. | |
| 10,036,319 B2 | 7/2018 | Murray et al. | |

(Continued)

OTHER PUBLICATIONS

Farooq Saeed and Ahmed Z. Al-Garni, An Inverse Designmethod for Aircraft Engine Sand Separator System, Sep. 7, 2012.

*Primary Examiner* — Sang K Kim
(74) *Attorney, Agent, or Firm* — Ingrassia Fisher & Lorenz LLP

(57) ABSTRACT

Gas turbine engines and methods are provided that utilize particle separation features. The engines include a compressor that receives a primary gas flow, having rotors and stators configured to impinge the primary gas flow, and an impeller downstream of the rotors and the stators. A first stator includes stator extraction holes in radially outer end walls thereof. A compressor case surrounds the rotors and the stators. The engines include a bleed air system including an interstage bleed plenum. The stator extraction holes are configured to direct a portion of the primary gas flow to the interstage bleed plenum as a secondary gas flow and thereby remove particles from the primary gas flow which the bleed air system removes from the interstage bleed plenum with bleed air to expel the particles from the gas turbine engine.

20 Claims, 7 Drawing Sheets

(56) References Cited

U.S. PATENT DOCUMENTS

| | | | |
|---|---|---|---|
| 10,202,903 B2 | 2/2019 | Ahmadian et al. | |
| 10,208,628 B2 | 2/2019 | Nasir et al. | |
| 10,286,407 B2 | 5/2019 | Correia et al. | |
| 10,302,019 B2 * | 5/2019 | Thomas, Jr. | F02C 9/18 |
| 10,400,670 B2 | 9/2019 | Kiszewski | |
| 10,513,979 B2 | 12/2019 | Renninger et al. | |
| 10,683,772 B2 * | 6/2020 | Dierksmeier | F04D 29/584 |
| 10,704,425 B2 | 7/2020 | Buhler et al. | |
| 10,718,340 B2 | 7/2020 | Takahashi et al. | |
| 10,724,436 B2 | 7/2020 | Mayer et al. | |
| 10,767,559 B2 | 9/2020 | Smith, III et al. | |
| 10,816,014 B2 | 10/2020 | Nasir et al. | |
| 10,835,848 B2 | 11/2020 | Clum et al. | |
| 10,907,503 B2 * | 2/2021 | Nolcheff | F01D 25/24 |
| 11,090,600 B2 | 8/2021 | Rambo | |
| 11,125,168 B2 | 9/2021 | Hanlon et al. | |
| 11,371,434 B2 | 6/2022 | Pearson et al. | |
| 11,415,319 B2 | 8/2022 | Moura et al. | |
| 11,421,595 B2 | 8/2022 | Nasir et al. | |
| 11,421,709 B2 | 8/2022 | Schugardt et al. | |
| 11,441,438 B2 * | 9/2022 | Becker | F04D 27/0215 |
| 11,560,844 B2 | 1/2023 | Sidorovich Paradiso | |
| 11,635,030 B2 * | 4/2023 | Donnelly | F04D 29/522 |
| | | | 60/785 |
| 11,668,237 B2 | 6/2023 | Renninger et al. | |
| 11,713,722 B2 | 8/2023 | Loebig | |
| 11,731,778 B1 | 8/2023 | Girard et al. | |
| 11,821,362 B2 | 11/2023 | Muldoon | |
| 11,946,474 B2 * | 4/2024 | Reynolds | F02C 6/08 |
| 2013/0047575 A1 * | 2/2013 | Sakai | F02C 9/18 |
| | | | 60/39.12 |
| 2015/0159560 A1 | 6/2015 | Kumar et al. | |
| 2020/0032818 A1 | 1/2020 | Nasir et al. | |
| 2022/0074426 A1 | 3/2022 | Schugardt et al. | |
| 2022/0275733 A1 | 9/2022 | Hollingshead et al. | |

* cited by examiner

GAS TURBINE ENGINES AND METHODS FOR PARTICLE SEPARATION

TECHNICAL FIELD

The present invention generally relates to turbine engine technologies, and more particularly relates to turbine engine designs for improved particle (e.g., sand) separation efficiency.

BACKGROUND

Turbine engines are used for a number of purposes, including propulsion and/or driving various other components with electrical, pneumatic, and/or hydraulic power, and may include both propulsion engines (e.g., for air, land, and sea vehicles) and auxiliary power units (APUs). Generally, a gas turbine engine includes a compressor section, a combustor section, and a turbine section. During operation, the compressor section draws in ambient air, compresses the air with one or more compressors, and supplies the compressed air to the combustor section. In addition to the compressed air, the combustor section receives fuel via a fuel injection assembly, mixes the fuel with the compressed air, ignites the air/fuel mixture, and supplies the high energy combustion gases to the turbine section to drive one or more turbines, including a shaft that may be used to drive the compressor(s) and otherwise generate power.

During operation, the ambient air drawn into the engine may contain undesirable particles, such as sand and dust, which may cause severe performance degradation, excessive wear, increased maintenance, and eventually premature removal of engines. This is especially true in hot and dry environments, such as desert climates, where such particles are more prevalent in the ambient air. In order to prevent or at least minimize the impacts of particle ingestion into the engine, many vehicles use an inlet particle separator system, disposed upstream of the engine compressor section, to remove at least a portion of the undesirable particles.

Conventional inlet particle separators, such as those described above, operate at relatively high efficiencies for relatively large particles (e.g., greater than about 20 microns and less than about 1000 microns in greatest cross-sectional length). However, for relatively small (fine) particles (e.g., equal to or less than about 20 microns in greatest cross-sectional length), the efficiencies can be relatively low, resulting in a significant amount of these relatively small particles being ingested into the engine. These relatively small particles may have deleterious effects on the turbine engine during operation. For example, these particles may plug secondary flow lines and/or may melt and form calcium magnesium aluminosilicate (CMAS) glass on relatively hot engine components, such as the combustor and/or turbine sections, which can significantly reduce performance and the operating life of the engine.

Due to the potentially deleterious effects of the small particles, there is an ongoing desire for improved systems and methods for particle separation within gas turbine engines. Commonly-assigned U.S. Pat. No. 11,421,595 (the contents of which are incorporated by reference herein in their entirety) describes various turbine engine designs for improved small (fine) particle separation efficiency. The present disclosure provides additional particle separation methodologies for use in connection with gas turbine engines. Furthermore, other desirable features and characteristics of the disclosure will become apparent from the subsequent detailed description and the appended claims, taken in conjunction with the accompanying drawings and this background of the disclosure.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

In various examples, a gas turbine engine is provided that includes a compressor configured to receive a primary gas flow during operation of the gas turbine engine for compression thereof. The compressor includes rotors and stators each having airfoils configured to impinge the primary gas flow and an impeller downstream of the rotors and the stators configured to receive the primary gas flow therefrom. At least a first stator of the stators includes stator extraction holes in radially outer end walls thereof. The gas turbine engine includes a compressor case radially surrounding the rotors and the stators of the compressor. The gas turbine engine includes a bleed air system including an interstage bleed plenum defined between surfaces of the compressor case and the impeller. The interstage bleed plenum is in fluidic communication with the stator extraction holes. The stator extraction holes are configured to direct a portion of the primary gas flow to the interstage bleed plenum as a secondary gas flow and thereby remove particles from the primary gas flow. The bleed air system is configured to remove the particles from the interstage bleed plenum with bleed air and expel the particles from the gas turbine engine.

In various examples, a method is provided that includes operating a compressor of a gas turbine engine to receive a primary gas flow for compression thereof, impinging the primary gas flow with airfoils of rotors and stators of the compressor, providing the primary gas flow to an impeller of the compressor downstream of the rotors and the stators, directing a portion of the primary gas flow through stator extraction holes in radially outer end walls of at least a first stator of the stators as a secondary gas flow, wherein the secondary gas flow includes particles suspended therein, directing the secondary gas flow from the case extraction holes into an interstage bleed plenum defined between surfaces of the compressor case and the impeller to deposit the particles therein, and operating a bleed air system to provide bleed air to the interstage bleed plenum and thereby remove the particles from the interstage bleed plenum and expel the particles from the gas turbine engine.

In various examples, an aircraft is provided that includes a gas turbine engine having a compressor configured to receive a primary gas flow during operation of the gas turbine engine for compression thereof. The compressor includes rotors and stators each having airfoils configured to impinge the primary gas flow and an impeller downstream of the rotors and the stators configured to receive the primary gas flow therefrom. At least a final stage stator of the stators that is disposed immediately upstream of the impeller includes stator extraction holes in radially outer end walls thereof. The stator extraction holes are circumferentially spaced apart to define at least one row of the stator extraction holes. The at least one row is closer to leading edges of the radially outer end walls of the final stage stator. The gas turbine engine includes a compressor case radially surrounding the rotors and the stators of the compressor. The aircraft includes a bleed air system including an interstage bleed plenum defined between surfaces of the compressor case and the impeller. The interstage bleed plenum is in fluidic communication with the case extraction holes. The stator extraction holes are configured to direct a portion of the primary gas flow to the interstage bleed plenum as a secondary gas flow and thereby remove particles from the primary gas flow. The bleed air system is configured to remove the particles from the interstage bleed plenum with bleed air and expel the particles from the gas turbine engine.

Furthermore, other desirable features and characteristics of the system, method, and aircraft will become apparent from the subsequent detailed description and the appended claims, taken in conjunction with the accompanying drawings and the preceding background.

BRIEF DESCRIPTION OF DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Briefly, systems and methods are disclosed herein that provide for removing particles from gas (e.g., air) flow within a gas turbine engine, such as those configured to propel aircraft. The gas turbine engines include strategically located holes in a compression section thereof that are capable of diverting a portion of the gas flow into a separate area of the engine, and in particular a portion of the gas flow that includes a high concentration of particles. In various examples, the particles may be transported into an interstage bleed plenum and subsequently expelled from the engine using a corresponding bleed air system. In this manner, particles may be separated from the gas flow and removed from the engine during operation thereof utilizing an existing bleed air system.

Figure 1:
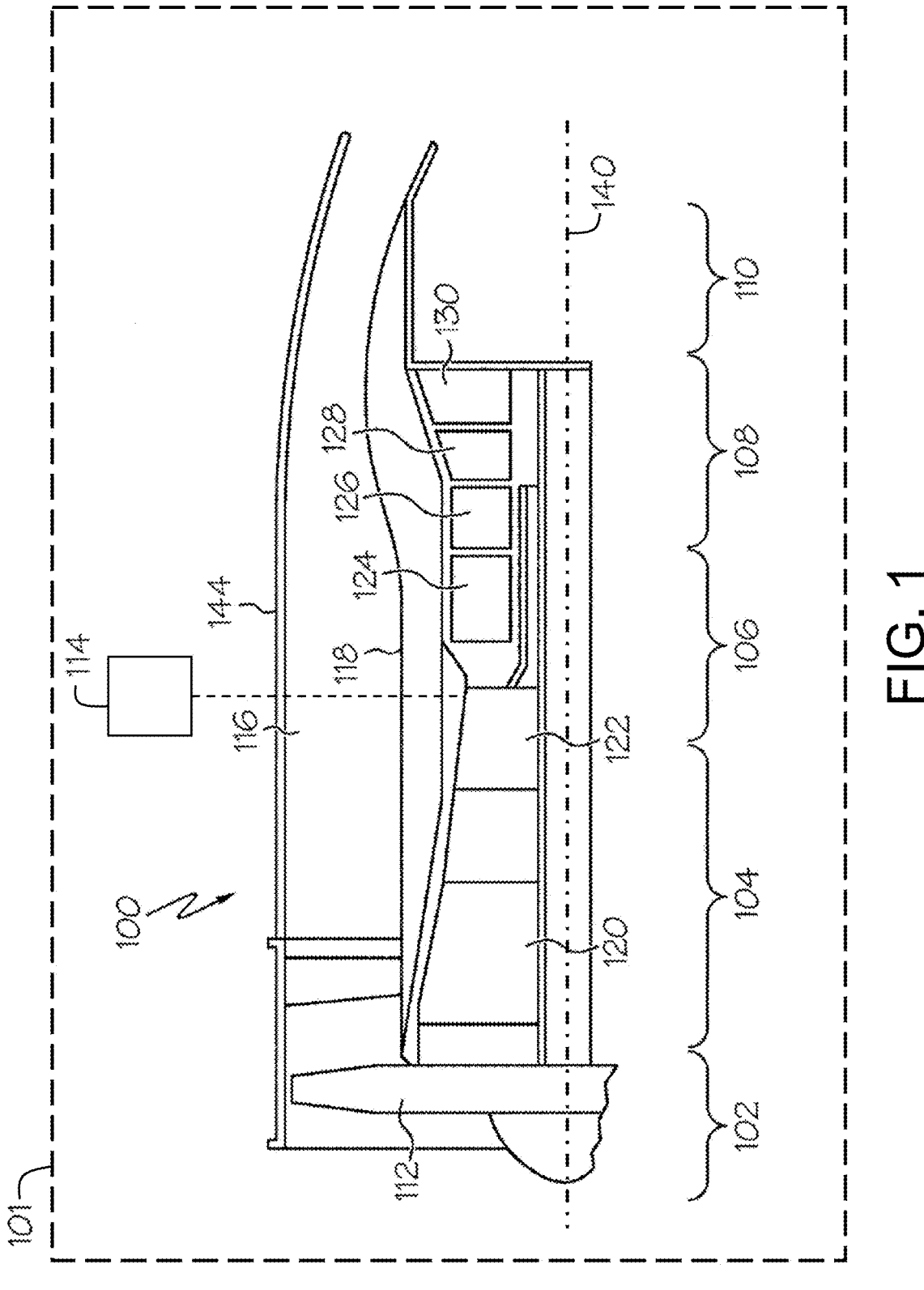
FIG. 1 is a schematic view of a gas turbine engine according to example embodiments of the present disclosure.

With reference to FIG. 1, a partial, cross-sectional view of an exemplary gas turbine engine 100 is shown with the remaining portion of the gas turbine engine 100 being substantially axisymmetric about a longitudinal axis 140, which also defines an axis of rotation for the gas turbine engine 100. In the depicted embodiment, the gas turbine engine 100 is an annular multi-spool turbofan gas turbine jet engine within an aircraft (represented schematically at 101), although features of the present disclosure may be included in other configurations, arrangements, and/or uses. For example, in other embodiments, the gas turbine engine 100 may assume the form of a non-propulsive engine, such as an Auxiliary Power Unit (APU) deployed onboard the aircraft 101, an industrial power generator, or other turbomachine.

In this example, with continued reference to FIG. 1, the gas turbine engine 100 includes a fan section 102, a compressor section 104, a combustor section 106, a turbine section 108, and an exhaust section 110. In one example, the fan section 102 includes a fan 112 mounted on a rotor that draws air into the gas turbine engine 100 and compresses it. A fraction of the compressed air exhausted from the fan 112 is directed through the outer bypass duct 116 and the remaining fraction of air exhausted from the fan 112 is directed into the compressor section 104. The outer bypass duct 116 is generally defined by an outer casing 144 that is spaced apart from and surrounds an inner bypass duct 118.

The compressor section 104 includes one or more compressors. The number of compressors in the compressor section 104 and the configuration thereof may vary. The one or more compressors sequentially raise the pressure of the air and direct a majority of the high-pressure fluid or air into the combustor section 106. In the embodiment of FIG. 1, the compressor section 104 is represented as including two compressors: a low pressure compressor (LPC) 120 and a high pressure compressor (HPC) 122. Compressors may generally be embodied as axial, radial, or mixed flow types. The LPC 120 raises the pressure of the air directed into it from the fan 112, and directs the compressed air into the HPC 122. The HPC 122 compresses the air still further, and directs the high pressure air into the combustor section 106.

In the combustor section 106, which includes a combustion chamber 124, the high-pressure air is mixed with fuel and is combusted. The high-temperature combustion air or combustive gas flow is directed into the turbine section 108. In this example, the turbine section 108 includes three turbines disposed in axial flow series, namely, a high-pressure turbine 126, an intermediate pressure turbine 128, and a low-pressure turbine 130. However, it will be appreciated that the number of turbines, and/or the configurations thereof, may vary. In this embodiment, the high-temperature combusted air from the combustor section 106 expands through and rotates each turbine 126, 128, and 130. The combustive gas flow then exits the turbine section 108 for mixture with the cooler bypass airflow from the outer bypass duct 116 and is ultimately discharged from the gas turbine engine 100 through the exhaust section 110. As the turbines 126, 128, 130 rotate, each drives equipment in the gas turbine engine 100 via concentrically disposed shafts or spools.

Figure 2:
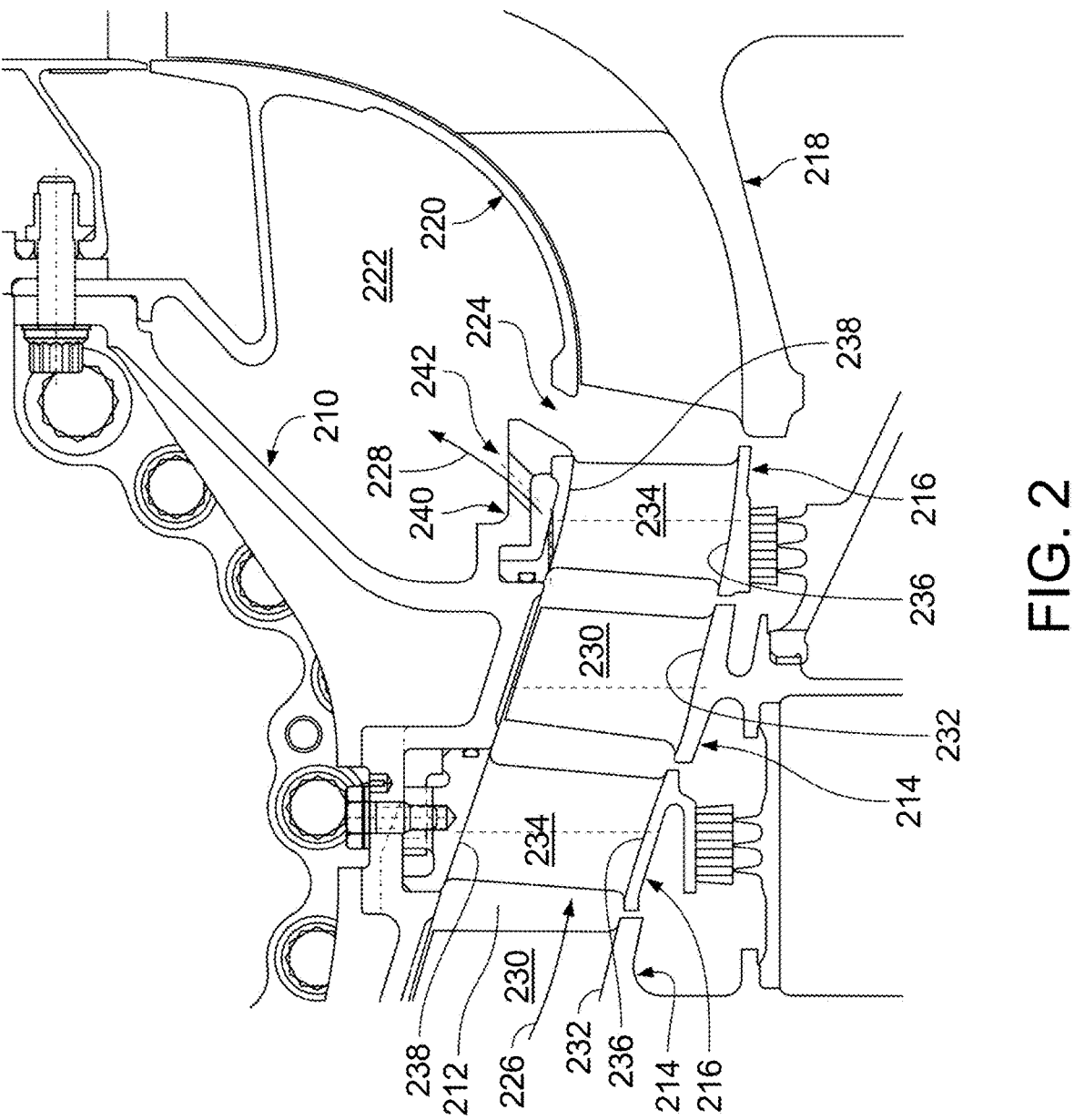
FIG. 2 is a cross-sectional view of a portion of a high-pressure compressor (HPC) of the gas turbine engine of FIG. 1 according to example embodiments of the present disclosure.

Referring now to FIG. 2, and with continued reference to FIG. 1, a portion the HPC 122 is represented in accordance with various examples. The HPC 122 includes an HPC case 210 that axially surrounds multiple alternating stages of axial flow rotors 214 and stators 216. Each of the rotors 214 includes a row of circumferentially spaced apart rotor blades 230 (e.g., rotating airfoils) fixed to a platform 232 which in turn is coupled to respective rotor disks via roots thereof. Each of the stators 216 includes a row of circumferentially spaced apart stator vanes 234 (e.g., stationary airfoils) fixed between a radially inner (hub-side) end wall 236 and a radially outer (shroud-side) end wall 238. The radially outer end walls 238 may be received within respective retaining rings 240 of the HPC case 210 and secured, for example, with set screws. The rotor blades 230 and the stator vanes 234 are disposed within an inner core duct 212 of the gas turbine engine 100 and configured to impinge a primary gas flow (represented by arrow 226) traveling therethrough during operation of the gas turbine engine 100.

The HPC 122 includes a HPC impeller 218 and a shroud 220 disposed within the HPC case 210 axially downstream of a final stage of the stators 216. The HPC impeller 218 is driven by a turbine and rotates about the longitudinal axis 140. The shroud 220 is disposed around the HPC impeller 218 and defines an impeller discharge flow passage therewith that extends radially outward from longitudinal axis 140. The HPC impeller 218 is configured to receive the primary gas flow 226 and accelerate, compress, and pressurize it.

Referring again to FIG. 1, the gas turbine engine 100 may include a bleed air system 114 configured to extract gas from various stages of the compressor section 104 to perform functions such as anti-icing, cabin pressurization, cooling, and engine stability. For example, the bleed air system 114 may be operated to extract gas during acceleration and deceleration to release excess pressure and prevent compressor stalls. The bleed air system 114 may include various bleed valves configured to automatically or manually regulate the amount of gas extracted, pressure regulators and check valves configured to maintain pressure and prevent reverse flow, and/or precoolers and heat exchangers configured to reduce bleed air temperature before it is used for certain aircraft systems.

In the example of FIG. 2, the HPC 122 includes an interstage bleed plenum 222, that is, a cavity defined, at least in part, between surfaces of the HPC case 210 and the shroud 220. An interstage bleed port 224 is disposed between the HPC case 210 and the shroud 220 adjacent to the inner core duct 212 to provide fluidic communication between the inner core duct 212 and the interstage bleed plenum 222. The bleed air system 114 may be operable to remove bleed air from the interstage bleed plenum 222 and thereby purge the interstage bleed plenum 222.

The HPC 122 may include particle separation features 242 configured to direct a portion of the primary gas flow 226 from the inner core duct 212 to the interstage bleed plenum 222 as a secondary gas flow (represented by arrow 228). It was determined that small (fine) particles within the compressor section 104 tend to track closely to the outer annular surfaces thereof as the primary gas flow 226 travels through the compressor section 104. The particle separation behavior results from the high swirl, reduced air density, reduced diameter, and cylindrical geometry within the compressor section 104. Specifically, the highly swirling flow generated by the rotating compressor components results in the generation of strong centrifugal forces on both the air flow and the solid particles entrained in the flow. The relative density difference between the solid particles and the air results in a preferentially larger centrifugal force on the particles relative to the air, which will in turn result in the particles being driven radially outward to the outer wall. The centrifugal forces imparted on the particles relative to the air stream is proportional to the relative densities of the particles to the air, the swirl velocity, and inversely proportional to the radial dimension of the flow path. These effects are all enhanced upstream of the HPC 122 and an associated diffuser where the air density is lower, the swirl velocity is higher, and the radial dimension is lower.

Therefore, the particle separation features 242 may be configured to remove particles from adjacent to the outer annular surfaces within the compressor section 104. Specifically, referring to FIG. 3, the particle separation features 242 may include stator extraction holes 244 extending through the radially outer end walls 238 of one or more of the stators 216 (e.g., the final stage stator 216), and case extraction holes 246 extending through the retaining ring 240 adjacent thereto. The stator extraction holes 244 and the case extraction holes 246 are configured to, in combination, direct the secondary gas flow 228 from the inner core duct 212 to the interstage bleed plenum 222 and thereby remove particles from the primary gas flow 226. Since the particles tend to track closely to the outer annular surfaces of the compressor section 104, a significant portion of the particles within the primary gas flow 226 may exit the inner core duct 212 in the secondary gas flow 228.

Figure 3:
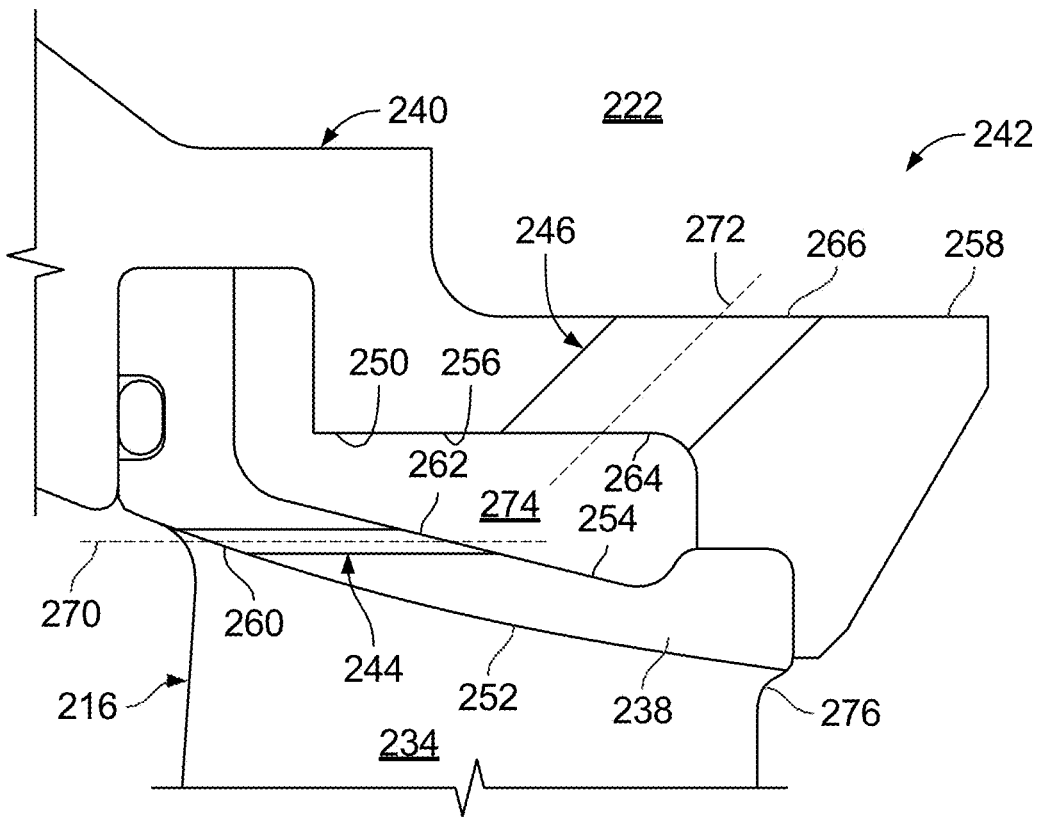
FIG. 3 includes an enlarged, cross-sectional view of a particle separation feature of the HPC of FIG. 2 defined in a radially outer end wall of a stator thereof and in a retaining ring of an HPC case thereof according to example embodiments of the present disclosure.
Figure 4:
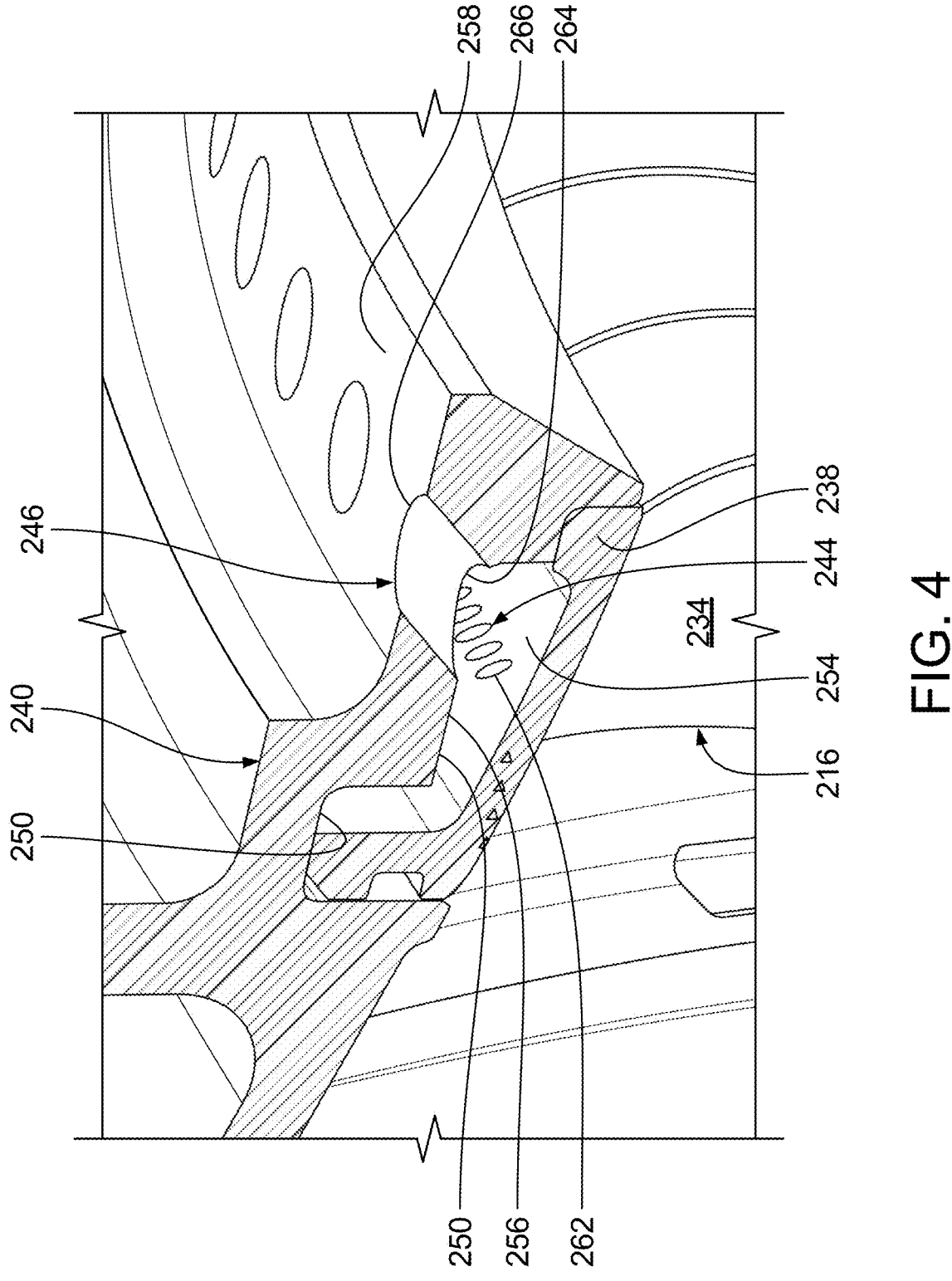
FIG. 4 includes a perspective, cross-sectional view of the particle separation feature of FIG. 3 according to example embodiments of the present disclosure.
Figure 5:
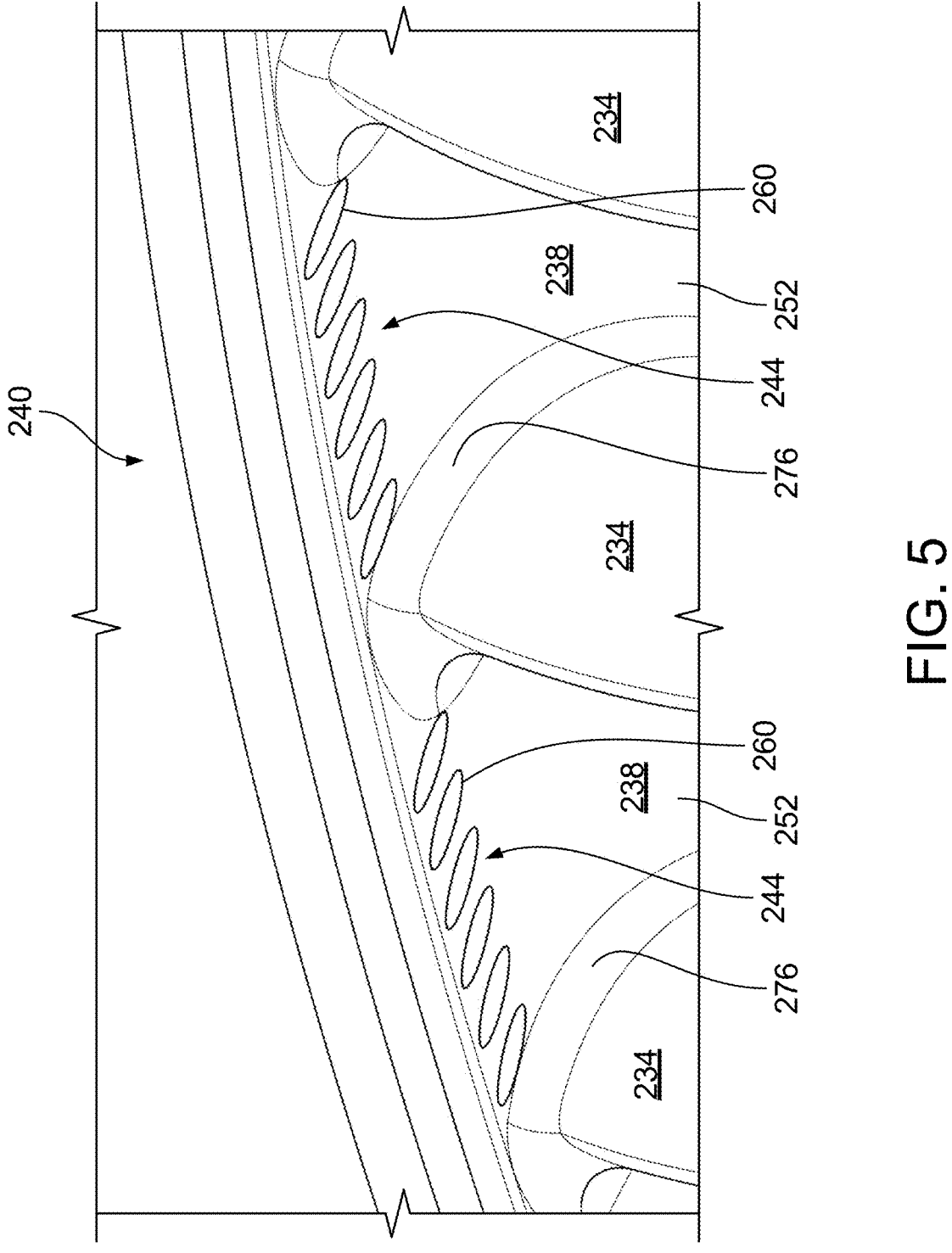
FIG. 5 includes a perspective view of the particle separation feature of FIGS. 3 and 4 as viewed from a point-of-view radially inward of the stator according to example embodiments of the present disclosure.
Figure 6:
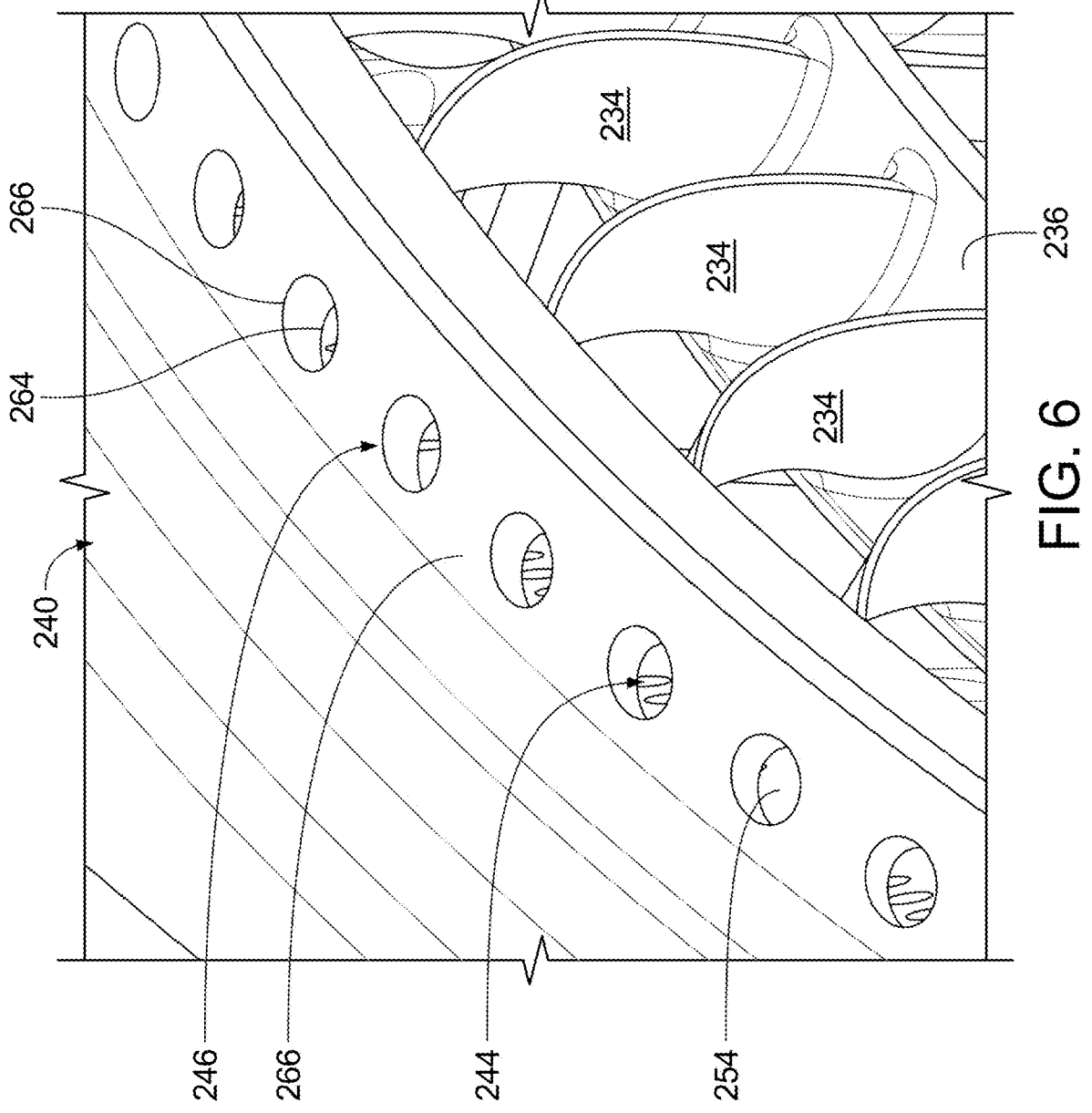
FIG. 6 represents a perspective view of the particle separation feature of FIGS. 3-5 as viewed from a point-of-view radially outward of the retainer ring according to example embodiments of the present disclosure.

FIGS. 3-6 represent various enlarged views of the particle separation features 242 in accordance with an example. FIG. 3 includes a cross-sectional view of the radially outer end walls 238 and the retaining ring 240. FIG. 4 includes a perspective, cross-sectional view of the radially outer end walls 238 and the retaining ring 240. FIG. 5 includes a perspective view of a portion of the stator 216 with the HPC case 210 thereabove. FIG. 6 represents a perspective view of a portion of the retaining ring 240 and the stator 216 therebelow. The stator extraction holes 244 define passages extending through the radially outer end walls 238 with an inlet 260 at a radially inner side 252 thereof and an outlet 262 at a radially outer side 254. Case extraction holes 246 define passages extending through the retaining ring 240 with an inlet 264 at a radially inner side 256 thereof and an outlet 266 at a radially outer side 258 thereof. Each of the passages defined by the stator extraction holes 244 have a central axis 270, and each of the passages defined by the case extraction holes 246 have a central axis 272. As represented in FIGS. 2-4, the radially outer end walls 238 are configured to be received and retained within a recess 250 on the radially inner side 256 of the retaining ring 240. In this example, an open space or cavity 274 is defined between the radially outer side 254 of the radially outer end walls 238 and the radially inner side 256 of the retaining ring 240.

Referring to FIGS. 4 and 5, the stator extraction holes 244 are circumferentially spaced apart along the radially outer end walls 238 between the stator vanes 234. The stator extraction holes 244 may be disposed at various positions between the leading edge and the trailing edge of the radially outer end walls 238 (e.g., adjacent to the leading edge in FIG. 4). Although represented as a single row of the stator extraction holes 244, the radially outer end walls 238 may include two or more rows of the stator extraction holes 244 between the leading edge and the trailing edge of the radially outer end walls 238. In such examples, the stator extraction holes 244 of adjacent rows may be aligned (e.g., along a flow path of the primary gas flow 226, may be circumferentially staggered from each other, or may be otherwise arranged. The rows may be equal-distant or may vary in dimensions therebetween. Although the radially outer end walls 238 are represented in FIG. 5 as having six of the stator extraction holes 244 between each of the stator vanes 234, the radially outer end walls 238 may include fewer or more of the stator extraction holes 244 in each row thereof between each of the stator vanes 234. For examples that include more than one row of the stator extraction holes 244, each of the rows may include the same quantity of the stator extraction holes 244, or the quantity of the stator extraction holes 244 may vary between the rows. The stator extraction holes 244 may be positioned so as to not interfere with a fillet region 276 of the stator vanes 234.

The stator extraction holes 244 may have various shapes, sizes, and orientations (e.g., rounded, oval-shaped, fan shaped or in between/combination of these shapes, etc.). In the example of FIGS. 4 and 5, the stator extraction holes 244 each include a circular-shaped passage with a major cross-sectional axis oriented along a flow path of the primary gas flow 226. The stator extraction holes 244 may have constant cross-sectional shapes and dimensions through the radially outer end walls 238 or may vary in cross-sectional shapes and/or dimensions. In some examples, the stator extraction holes 244 may define fan-shaped passages through the radially outer end walls 238. For example, the stator extraction holes 244 may increase in size from the inlet 260 thereof to the outlet 262 thereof. The central axes 270 of the passages defined by each the stator extraction holes 244 may be substantially perpendicular to the radially inner side 252 and the radially outer side 254 of the radially outer end walls 238, or may be oriented at another angle relative thereto. For example, the central axes 270 of the passages may be oriented at an angle such that the inlet 260 of the stator extraction holes 244 at the radially inner side 252 is closer to the leading edge of the radially outer end walls 238 that the outlet 262, and the outlet 262 of the stator extraction holes 244 at the radially outer side 254 is closer to the trailing edge of the radially outer end walls 238 than the inlet 260. In some examples, the central axes 270 of the stator extraction holes 244 may vary relative to each other within a row or between rows.

Referring to FIGS. 4 and 6, the case extraction holes 246 are circumferentially spaced apart along the retaining ring 240 radially outward from the stator 216. The case extraction holes 246 may have various shapes, sizes, quantities, and dimensions. In FIGS. 3, 4, and 6, the case extraction holes 246 have a larger cross-sectional area than the stator extraction holes 244; however, the particle separation features 242 are not limited to this arrangement. The case extraction holes 246 may have constant cross-sectional shapes and dimensions through the retaining ring 240 or may vary in cross-sectional shapes and/or dimensions. The central axis 272 of the passages defined by the case extraction holes 246 may be substantially perpendicular to the radially inner side 256 and the radially outer side 258 of the retaining ring 240, or may be oriented at another angle relative thereto. In the example of the figures, the case extraction holes 246 have constant, circular cross-sectional shapes that define passages through the retaining ring 240 with the inlet 264 thereof closer to the leading edge of the retaining ring 240 than the outlet 266 thereof. In some examples, as shown in FIGS. 2-4, the outlets 262 of the stator extraction holes 244 are axially forward of the inlets 264 of the case extraction holes. The case extraction holes

246 may be formed so as to not interfere with the integrity and function of the retaining ring 240.

As previously noted, the particle separation features 242 are configured to remove particles from the primary gas flow 226 within the compressor section 104 and transport the particles to the interstage bleed plenum 222 in the secondary gas flow 228. The bleed air system 114 may be operated to use bleed air to remove the particles from the interstage bleed plenum 222 and subsequently expel the particles from the gas turbine engine 100 (e.g., via a scavenge duct). In some examples, the bleed air system 114 may be manually or automatically operated specifically to remove the particles from the interstage bleed plenum 222. For example, the bleed air system 114 may be operated periodically to remove the particles from the interstage bleed plenum 222, especially while the aircraft 101 is operating in high particle concentration regions (e.g., desert environments, dirt runways, etc.), for example, that include particles having sizes ranging from 0.1 to 20 micrometers. As another example, the bleed air system 114 may be operated periodically or continuously to remove the particles from the interstage bleed plenum 222 while the aircraft 101 is operating below a certain altitude (e.g., low flying conditions, near ground flying, hovering conditions, etc.) such as below 500 ft (about 150 meters) above ground level, such as below 50 ft (about 15 meters) above ground level.

In some examples, the bleed air system 114 may be operated in accordance with its normal schedule and/or parameters, and the particles may be inherently removed at such times. For example, the bleed air system 114 may be operated to promote stability of the compressors during acceleration and/or deceleration to release excess pressure and prevent compressor stalls. During such operation, the particles within the interstage bleed plenum 222 may be removed as well, thereby achieving two separate goals simultaneously (i.e., engine stability and particle removal). In such examples, the bleed air system 114 may be operated in accordance with its normal operational parameters (e.g., to promote engine stability) or may be operated with adjusted parameters such as schedule timing, bleed air flows, etc. For example, the bleed air schedule may be adjusted to promote particle removal despite some performance loss. In some examples, the bleed air system 114 may be operated with bleed air flows of 20 to 25 percent at certain engine operating conditions.

Although the particle separation features 242 are described herein in reference to the final stage stator 216, the retaining ring 240, and the corresponding interstage bleed plenum 222, it should be understood that the particles separation features 242 may be included in other stators 216 and their corresponding retainer rings and interstage bleed plenums, either as an alternative to the final stage stator 216 or in addition to the final stage stator 216. In such examples, the other stators including the particle separation features 242 may include stator extraction holes and case extractions holes as described herein for the final stage stator 216, and the bleed air system 114 may be operable to purge the corresponding interstage plenums as described herein for the final stage stator 216.

Figure 7:
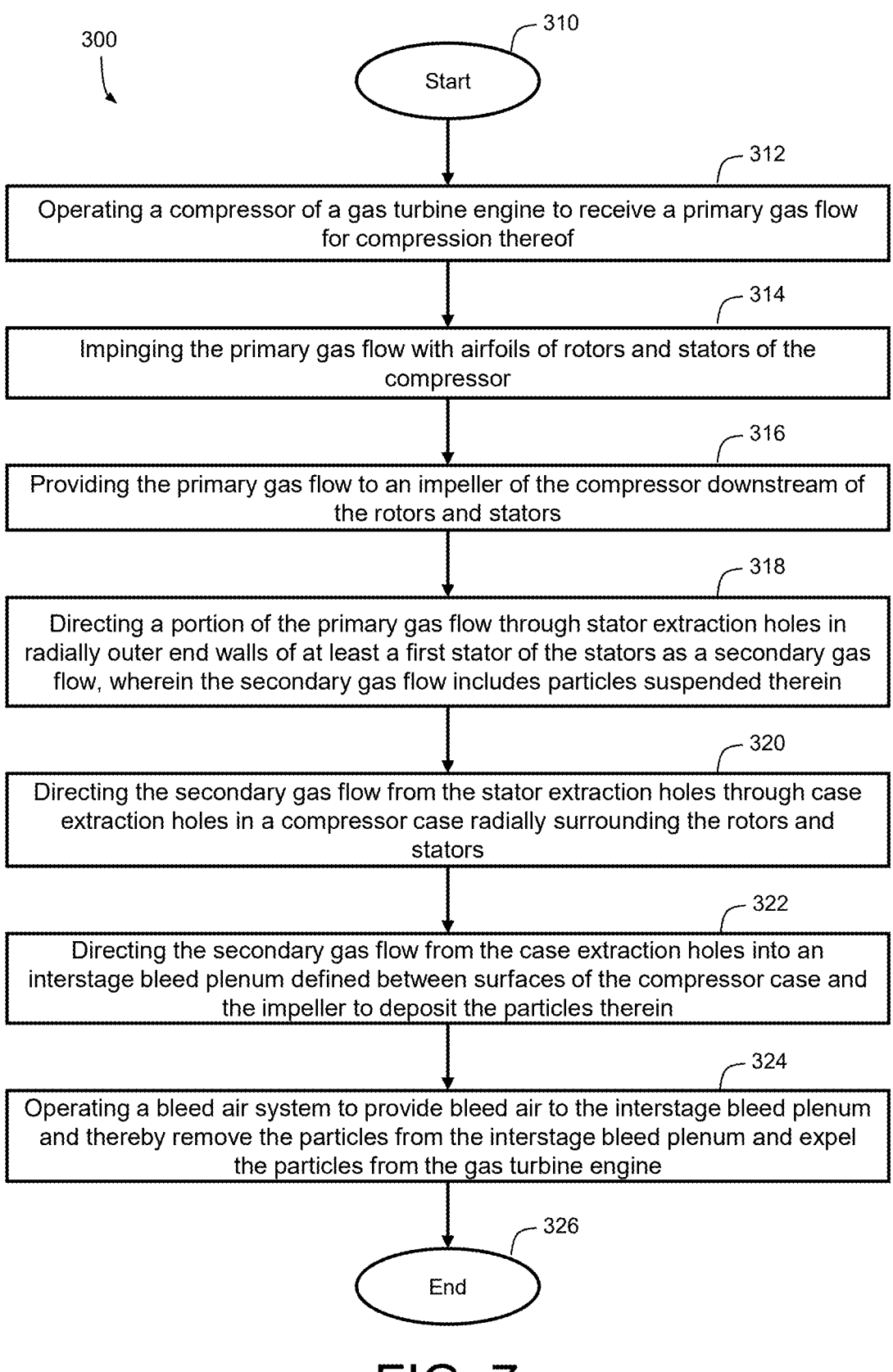
FIG. 7 is a flowchart illustrating an exemplary method for removing particles from a primary gas flow within a gas turbine engine in accordance with an embodiment.

The systems disclosed herein, including the gas turbine engine 100, provide for methods of particle separation and removal during engine operation. For example, FIG. 7 is a flowchart illustrating an exemplary method 300. The method 300 may start at 310. At 312, the method 300 may include operating an axial compressor of a gas turbine engine to receive a primary gas flow for compression thereof. At 314, the method 300 may include impinging the primary gas flow with airfoils of rotors and stators of the compressor. At 316, the method 300 may include providing the primary gas flow to an impeller of the compressor downstream of the rotors and stators. At 318, the method 300 may include directing a portion of the primary gas flow through stator extraction holes in radially outer end walls of at least a first stator of the stators as a secondary gas flow, wherein the secondary gas flow includes particles suspended therein. At 320, the method 300 may include directing the secondary gas flow from the stator extraction holes through case extraction holes in a compressor case radially surrounding the rotors and stators. At 322, the method 300 may include directing the secondary gas flow from the case extraction holes into an interstage bleed plenum defined between surfaces of the compressor case and the impeller to deposit the particles therein. At 324, the method 300 may include operating a bleed air system to provide bleed air to the interstage bleed plenum and thereby remove the particles from the interstage bleed plenum and expel the particles from the gas turbine engine. In some examples, operating the bleed air system is performed in accordance with a bleed schedule that is configured to promote stability of the compressor during acceleration and/or deceleration of the gas turbine engine. The method 300 may end at 326.

The systems and methods disclosed herein provide various benefits over certain existing systems and methods. For example, the particle extraction features provide for removing a significant number of particles (e.g., sand) from the primary gas flow prior to the combustor section and/or turbine section, thereby potentially reducing erosion and maintaining engine efficiency. Further, incorporating the particle extraction features into the bleed air system promotes continuous or periodic purging of separated particles from the engine thereby avoiding excessive accumulation therein.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

As used herein, the term "axial" refers to a direction that is generally parallel to or coincident with an axis of rotation, axis of symmetry, or centerline of a component or components. For example, in a cylinder or disc with a centerline and generally circular ends or opposing faces, the "axial" direction may refer to the direction that generally extends in parallel to the centerline between the opposite ends or faces. In certain instances, the term "axial" may be utilized with respect to components that are not cylindrical (or otherwise radially symmetric). For example, the "axial" direction for a rectangular housing containing a rotating shaft may be viewed as a direction that is generally parallel to or coincident with the rotational axis of the shaft. Furthermore, the term "radially" as used herein may refer to a direction or a relationship of components with respect to a line extending outward from a shared centerline, axis, or similar reference, for example in a plane of a cylinder or disc that is perpendicular to the centerline or axis. In certain instances, components may be viewed as "radially" aligned even though one or both of the components may not be cylindrical (or otherwise radially symmetric). Furthermore, the terms "axial" and "radial" (and any derivatives) may encompass directional relationships that are other than precisely aligned with (e.g., oblique to) the true axial and radial dimensions, provided the relationship is predominantly in the respective nominal axial or radial direction. As used herein, the term "substantially" denotes within 5% to account for manufacturing tolerances. Also, as used herein, the term "about" denotes within 5% to account for manufacturing tolerances.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A gas turbine engine, comprising:

a compressor configured to receive a primary gas flow during operation of the gas turbine engine for compression thereof, wherein the compressor includes rotors and stators each having airfoils configured to impinge the primary gas flow and an impeller downstream of the rotors and the stators configured to receive the primary gas flow therefrom, wherein at least a first stator of the stators includes stator extraction holes in radially outer end walls thereof;

a compressor case radially surrounding the rotors and the stators of the compressor, the compressor case comprising a retainer ring configured to receive the radially outer end walls of the first stator, the retainer ring including case extraction holes defining passages therethrough that provide fluidic communication between the stator extraction holes and an interstage bleed plenum; and a bleed air system including the interstage bleed plenum defined between surfaces of the compressor case and the impeller, wherein the interstage bleed plenum is in fluidic communication with the case extraction holes, the bleed air system including bleed holes defining passages through the compressor case to provide fluidic communication to the interstage bleed plenum;

wherein the stator extraction holes and the case extraction holes are configured to, in combination, direct a portion of the primary gas flow to the interstage bleed plenum as a secondary gas flow and thereby remove particles from the primary gas flow, wherein the bleed air system is configured to remove the particles from the interstage bleed plenum with bleed air and expel the particles from the gas turbine engine.

2. The gas turbine engine of claim 1, wherein the first stator is a final stage stator disposed immediately upstream of the impeller.

3. The gas turbine engine of claim 1, wherein the stator extraction holes are circumferentially spaced apart to define at least one row of the stator extraction holes, wherein the at least one row is closer to leading edges of the radially outer end walls of the first stator than to trailing edges of the radially outer end walls of the first stator.

4. The gas turbine engine of claim 1, wherein the case extraction holes have a larger cross-sectional area than the stator extraction holes, wherein outlets of the stator extraction holes are axially forward of inlets of the case extraction holes.

5. The gas turbine engine of claim 1, wherein the bleed air system is configured to remove the particles from the interstage bleed plenum in accordance with a bleed schedule that is configured to promote stability of the compressor during acceleration and/or deceleration of the gas turbine engine.

6. The gas turbine engine of claim 5, wherein the bleed air system includes bleed valves configured to adjust a schedule timing and a flow rate of the bleed air system and operate the bleed air system at the schedule timing and the flow rate, wherein the schedule timing and the flow rate promote removal of the particles despite performance loss.

7. The gas turbine engine of claim 1, wherein the stator extraction holes have a major cross-sectional axis oriented along a flow path of the primary gas flow.

8. The gas turbine engine of claim 1, wherein the first stator includes more than one of the stator extraction holes between each of the stator vanes thereof.

9. The gas turbine engine of claim 1, wherein the bleed air system is configured to be operated to remove the particles from the interstage bleed plenum while the aircraft is in flight below 500 feet above ground level.

10. The gas turbine engine of claim 1, wherein the bleed air system is configured to operate with bleed air flows of 20 to 25 percent during particle removal.

11. The gas turbine engine of claim 1, wherein the stator extraction holes define fan-shaped passages that increase in size from the inlet to the outlet.

12. The gas turbine engine of claim 1, wherein central axes of the stator extraction holes are oriented at an angle such that the inlet is closer to the leading edges of the end wall than the outlet.

13. A method, comprising:

operating a compressor of a gas turbine engine to receive a primary gas flow for compression thereof;

impinging the primary gas flow with airfoils of rotors and stators of the compressor;

providing the primary gas flow to an impeller of the compressor downstream of the rotors and the stators, directing a portion of the primary gas flow through stator extraction holes in radially outer end walls of at least a first stator of the stators as a secondary gas flow, wherein the secondary gas flow includes particles suspended therein;

directing the secondary gas flow from the stator extraction holes through case extraction holes in a retainer ring of a compressor case radially surrounding the rotors and the stators, the case extraction holes defining passages through the retainer ring, the retainer ring receiving therein the radially outer end walls of the first stator;

directing the secondary gas flow from the case extraction holes into an interstage bleed plenum defined between surfaces of the compressor case and the impeller to deposit the particles therein; and operating a bleed air system to provide bleed air to the interstage bleed plenum and thereby remove the particles from the interstage bleed plenum and expel the particles from the gas turbine engine.

14. The method of claim 13, wherein the first stator is a final stage stator disposed immediately upstream of the impeller.

15. The method of claim 13, further comprising providing the stator extraction holes to be circumferentially spaced apart to define at least one row of the stator extraction holes that is closer to leading edges of the radially outer end walls of the first stator than trailing edges of the radially outer end walls of the first stator.

16. The method of claim 13, further comprising providing the case extraction holes to have a larger cross-sectional area than the stator extraction holes, and to have outlets of the stator extraction holes axially forward of inlets of the case extraction holes.

17. The method of claim 13, wherein operating the bleed air system is performed in accordance with a bleed schedule that is configured to promote stability of the compressor during acceleration and/or deceleration of the gas turbine engine.

18. The method of claim 13, further comprising directing another portion of the primary gas flow through bleed holes to the interstage bleed plenum as a tertiary gas flow, wherein the bleed holes define passages through the compressor case.

19. An aircraft, comprising:

a gas turbine engine, comprising:

a compressor configured to receive a primary gas flow during operation of the gas turbine engine for compression thereof, wherein the compressor includes rotors and stators each having airfoils configured to impinge the primary gas flow and an impeller downstream of the rotors and the stators configured to receive the primary gas flow therefrom, wherein at least a final stage stator of the stators that is disposed immediately upstream of the impeller includes stator extraction holes in radially outer end walls thereof, wherein the stator extraction holes are circumferentially spaced apart to define at least one row of the stator extraction holes, wherein the at least one row is closer to leading edges of the radially outer end walls of the final stage stator than to trailing edges of the radially outer end walls of the final stage stator;

a compressor case radially surrounding the rotors and the stators of the compressor, the compressor case comprising a retainer ring configured to receive the radially outer end walls of the final stage stator, the retainer ring including case extraction holes defining passages therethrough that provide fluidic communication between the stator extraction holes and an interstage bleed plenum; and a bleed air system including the interstage bleed plenum defined between surfaces of the compressor case and the impeller, wherein the interstage bleed plenum is in fluidic communication with the case extraction holes, the bleed air system including bleed holes defining passages through the compressor case to provide fluidic communication to the interstage bleed plenum;

wherein the stator extraction holes and the case extraction holes are configured to, in combination, direct a portion of the primary gas flow to the interstage bleed plenum as a secondary gas flow and thereby remove that particles from the primary gas flow, wherein the bleed air system is configured to remove the particles from the interstage bleed plenum with bleed air and expel the particles from the gas turbine engine, wherein the case extraction holes have a larger cross-sectional area than the stator extraction holes, wherein outlets of the stator extraction holes are axially forward of inlets of the case extraction holes.

20. The aircraft of claim 19, wherein the bleed air system is configured to remove the particles from the interstage bleed plenum in accordance with a bleed schedule that is configured to promote stability of the compressor during acceleration and/or deceleration of the gas turbine engine.

* * * * *